(12) United States Patent
Kako et al.

(10) Patent No.: US 8,507,143 B2
(45) Date of Patent: Aug. 13, 2013

(54) FUEL CELL SYSTEM AND METHOD OF REDUCING DECREASE IN POWER GENERATION EFFICIENCY OF FUEL CELL

(75) Inventors: Tomoyuki Kako, Toyota (JP); Keiko Tanaka, Toyota (JP); Kei Okamoto, Toyota (JP); Seiji Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/582,303

(22) PCT Filed: Apr. 22, 2010

(86) PCT No.: PCT/JP2010/002927
§ 371 (c)(1),
(2), (4) Date: Aug. 31, 2012

(87) PCT Pub. No.: WO2011/132229
PCT Pub. Date: Oct. 27, 2011

(65) Prior Publication Data
US 2013/0052554 A1   Feb. 28, 2013

(51) Int. Cl.
*H01M 8/04* (2006.01)
(52) U.S. Cl.
USPC .................................. 429/435; 429/433
(58) Field of Classification Search
USPC ........................................................ 429/435
See application file for complete search history.

(56) References Cited

U.S. PATENT DOCUMENTS

| | | | |
|---|---|---|---|
| 2005/0058866 A1* | 3/2005 | Rocke et al. | 429/26 |
| 2006/0040154 A1* | 2/2006 | Makuta et al. | 429/26 |
| 2008/0145731 A1 | 6/2008 | Sakajo et al. | |
| 2009/0130513 A1 | 5/2009 | Tsuchiya et al. | |
| 2009/0148737 A1* | 6/2009 | Wang et al. | 429/24 |

FOREIGN PATENT DOCUMENTS

| | | |
|---|---|---|
| JP | A-2001-315524 | 11/2001 |
| JP | A-2003-242993 | 8/2003 |
| JP | A-2005-100752 | 4/2005 |
| JP | A-2008-027797 | 2/2008 |
| JP | A-2008-037302 | 2/2008 |
| JP | A-2008-094207 | 4/2008 |

OTHER PUBLICATIONS

Jul. 20, 2010 International Search Report issued in International Patent Application No. PCT/JP2010/002927.

* cited by examiner

*Primary Examiner* — John S Maples
(74) *Attorney, Agent, or Firm* — Oliff & Berridge, PLC (57) ABSTRACT

A fuel cell system including a fuel cell, includes: a heater core used by a heating device; a first circulation circuit arranged to circulate a heat medium through the fuel cell; a second circulation circuit arranged to circulate the heat medium through the heater core; a connection channel arranged to connect the first circulation circuit with the second circulation circuit and thereby circulate the heat medium between the first circulation circuit and the second circulation circuit; and a first temperature regulator located on the second circulation circuit and downstream of the heater core and configured to regulate temperature of the heat medium after flowing out of the heater core and before flowing into the fuel cell.

2 Claims, 5 Drawing Sheets

FUEL CELL SYSTEM AND METHOD OF REDUCING DECREASE IN POWER GENERATION EFFICIENCY OF FUEL CELL

TECHNICAL FIELD

The present invention relates to a fuel cell system that utilizes the exhaust heat of a fuel cell.

BACKGROUND ART

In a vehicle equipped with a fuel cell, one known technique utilizes the exhaust heat of the fuel cell as the heat source for regulating the temperature in the vehicle interior. More specifically, this technique supplies a heat medium, such as cooling water, flowing through the fuel cell to a heater core for air conditioning and supplies the air having the temperature regulated by the heater core to the vehicle interior (e.g., PTL1).

This known technique, however, has the problem of the decreased power generation efficiency of the fuel cell, because the heat medium supplied to the fuel cell has a temperature change when going through the heater core.

This problem is not characteristic of the vehicle equipped with the fuel cell but is commonly found in fuel cell systems including fuel cells.

CITATION LIST

Patent Literatures

PTL1: JP 2001-315524A

SUMMARY

Technical Problem

In order to solve at least part of the foregoing, the object of the invention is to provide a technique of reducing a decrease in power generation efficiency of a fuel cell in a fuel cell system that utilizes exhaust heat of the fuel cell.

Solution to Problem

In order to achieve at least part of the foregoing, the invention provides various aspects and embodiments described below.

According to a first aspect, there is provided a fuel cell system including a fuel cell, which comprises: a heater core used by a heating device; a first circulation circuit arranged to circulate a heat medium through the fuel cell; a second circulation circuit arranged to circulate the heat medium through the heater core; a connection channel arranged to connect the first circulation circuit with the second circulation circuit and thereby circulate the heat medium between the first circulation circuit and the second circulation circuit; and a first temperature regulator located on the second circulation circuit and downstream of the heater core and configured to regulate temperature of the heat medium after flowing out of the heater core and before flowing into the fuel cell.

In the fuel cell system of the first aspect, the first temperature regulator regulates the temperature of the heat medium before flowing into the fuel cell. This advantageously reduces a decrease in power generation efficiency of the fuel cell.

According to a second aspect, there is provided the fuel cell system of the first aspect, which further comprises: a first temperature sensor located upstream of the fuel cell and configured to measure temperature of the heat medium before flowing into the fuel cell; and a controller configured to control the first temperature regulator, based on the temperature of the heat medium measured by the first temperature sensor.

In the fuel cell system of the second aspect, the controller controls the first temperature regulator, based on the temperature of the heat medium before flowing into the fuel cell. This enables the temperature of the heat medium flowing into the fuel cell to be regulated with higher precision.

According to a third aspect, there is provided the fuel cell system of either the first aspect or the second aspect, which further comprises: a second temperature regulator located on the second circulation circuit and upstream of the heater core and configured to regulate temperature of the heat medium after flowing out of the fuel cell and before flowing into the heater core.

In the fuel cell system of the third aspect, the second temperature regulator regulates the temperature of the heat medium before flowing into the heater core. The temperature of the heat medium flowing into the heater core can thus be regulated to a desired temperature required for the heater core.

According to a fourth aspect, there is provided the fuel cell system of the third aspect, which further comprises a second temperature sensor located upstream of the heater core and configured to measure temperature of the heat medium before flowing into the heater core, wherein the controller controls the second temperature regulator, based on the temperature of the heat medium measured by the second temperature sensor.

In the fuel cell system of the fourth aspect, the controller controls the second temperature regulator, based on the temperature of the heat medium before flowing into the heater core. This enables the temperature of the heat medium flowing into the heater core to be regulated with higher precision.

According to a fifth aspect, there is provided the fuel cell system of the fourth aspect, wherein the first temperature regulator is a first electric heater, the second temperature regulator is a second electric heater, and the controller feedback-controls heater capacity of the first electric heater based on a target temperature of the heat medium allowable for the fuel cell, while feedback-controlling heater capacity of the second electric heater based on a target temperature of the heat medium required by the heating device.

The fuel cell system of the fifth aspect feedback-controls the heater capacities of the first and second electric heaters, thus enabling the temperatures of the heat medium to approach the respective target temperatures.

According to a sixth aspect, there is provided a method of reducing a decrease in power generation efficiency of a fuel cell. The method employs a first circulation circuit to circulate a heat medium through the fuel cell, employs a second circulation circuit to circulate the heat medium through a heater core used by a heating device, connects the first circulation circuit with the second circulation circuit to circulate the heat medium between the first circulation circuit and the second circulation circuit, and regulates temperature of the heat medium after flowing out of the heater core and before flowing into the fuel cell.

The present invention may be implemented by diversity of aspects, for example, a method and an apparatus for reducing a decrease in power generation efficiency of a fuel cell, an integrated circuit and a computer program that enable the functions of such a method or an apparatus, and a storage medium in which such a computer program is stored.

DESCRIPTION OF EMBODIMENTS

Some embodiments of the invention are described below.

A. First Embodiment

Figure 1:
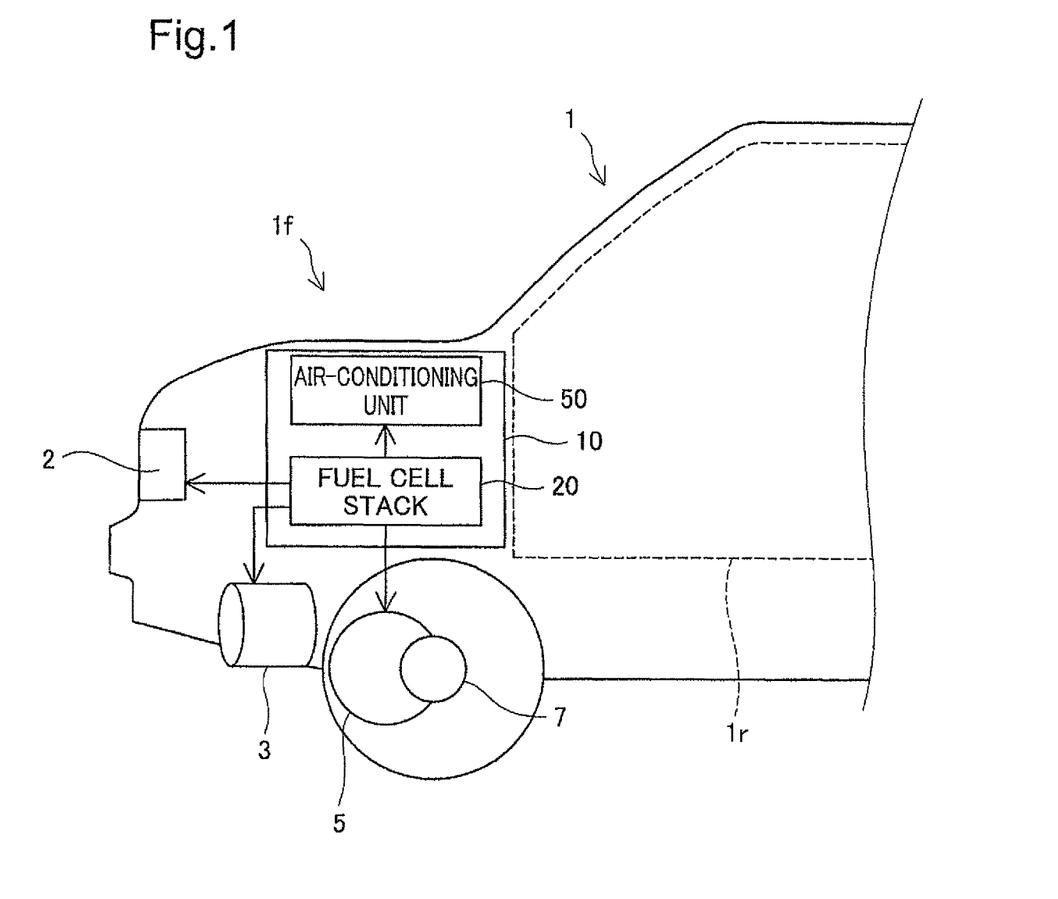
FIG. 1 schematically illustrates the configuration of the periphery of a front portion if of a vehicle 1 with a fuel cell system 10 according to one embodiment of the invention.

FIG. 1 schematically illustrates the configuration of the periphery of a front portion if of a vehicle 1 with a fuel cell system 10 according to one embodiment of the invention. As depicted, the front portion 1f is mainly provided with the fuel cell system 10, headlights 2 and an air compressor 3. The fuel cell system 10 primarily includes a fuel cell stack 20 and an air-conditioning unit 50. The front portion 1f is further provided with a drive motor 5 configured to produce driving force for the vehicle 1 from the electric power generated by the fuel cell stack 20 and a gear 7 provided to transmit the torque produced by the drive motor 5 to an axle. The headlights 2, the air-conditioning unit 50 and the air compressor 3 are also driven with the electric power generated by the fuel cell stack 20. The air-conditioning unit 50 serves to control the internal temperature of a vehicle interior 1r.

Figure 2:
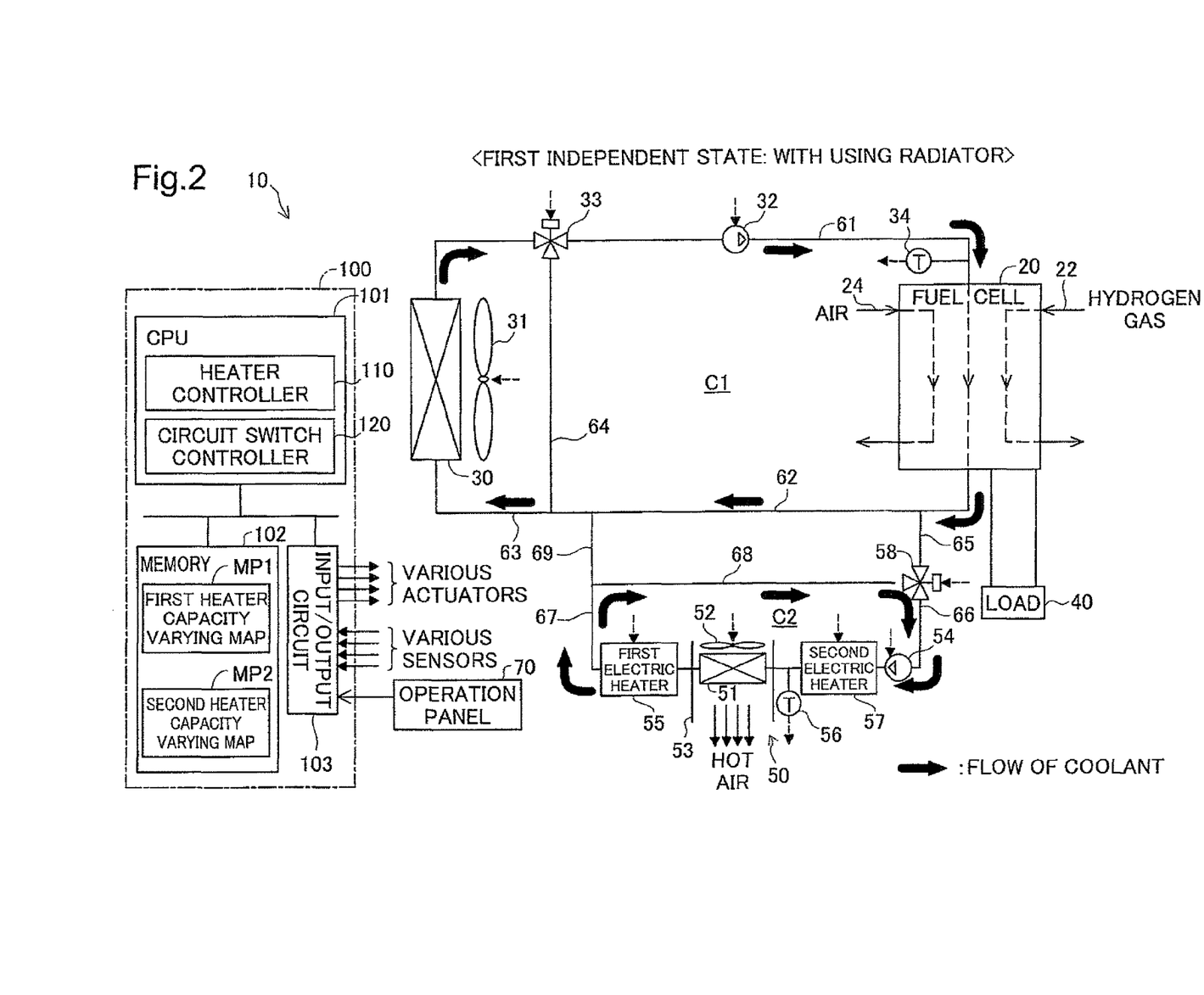
FIG. 2 illustrates the structure of the fuel cell system 10 and its periphery.

FIG. 2 illustrates the structure of the fuel cell system 10 and its periphery. The fuel cell system 10 mainly includes the fuel cell stack 20 and a control unit 100 and also has a first circulation circuit C1 and a second circulation circuit C2 for heat transfer in the system. In the drawings, the thick solid-line arrows show the flows of a heat medium.

The first circulation circuit C1 primarily serves to transfer a heat medium absorbing the heat generated by the fuel cell stack 20 to a radiator 30 and to circulate the heat medium cooled down by the radiator 30 to the fuel cell stack 20. Such circulation is performed by a pump 32. The heat medium pressed out by the pump 32 sequentially flows through a first heat medium channel 61, an internal medium channel of the fuel cell 20, a second heat medium channel 62, a third heat medium channel 63, the radiator 30 and a first three-way valve 33 and is returned to the pump 32. The radiator 30 is provided with a fourth heat medium channel 64 as a bypass passage. This fourth heat medium channel 64 branches off at a point from the second heat medium channel 62 to the third heat medium channel 63 and joins with the first heat medium channel 61 at the first three-way valve 33. These channels constitute the first circulation circuit C1.

Two input ports of the first three-way valve 33 are respectively connected with the fourth heat medium channel 64 and with an outlet pipe of the radiator 30, while an output port of the first three-way valve 33 is connected with the first heat medium channel 61. The first three-way valve 33 has two switch positions "a" and "b" and is operated to change over the port in response to a signal from the control unit 100. At the position "a" illustrated in FIG. 2, the first three-way valve 33 makes the outlet pipe of the radiator 30 communicate with the first heat medium channel 61 and blocks the communication with the fourth heat medium channel 64, so that the heat medium going through the radiator 30 is circulated through the first circulation circuit C1. When the first three-way valve 33 is changed over from this state to the operating position "b", on the other hand, the connection of flow passage is changed over, so that the heat medium going through the fourth heat medium channel 64 is circulated through the first circulation circuit C1.

The second circulation circuit C2 is a circulation passage to transfer a required amount of heat for air-conditioning on the heat medium to the air-conditioning unit 50. Such circulation is performed by a second pump 54. The heat medium pressed out by the second pump 54 sequentially flows through a sixth heat medium channel 66 provided with the second pump 54, a heater core 51, a seventh heat medium channel 67, an eighth heat medium channel 68 and a second three-way valve 58 and is returned to the second pump 54. A second electric heater 57 is provided on the flow path from the second pump 54 to the heater core 51. A first electric heater 55 is provided on the flow path from the heater core 51 to the seventh heat medium channel 67. The heater core 51 serves as a heat exchange unit for heating used by the air-conditioning unit 50.

The second circulation circuit C2 is connected with the first circulation circuit C1 at two different positions, so that the heat medium is sharable by the two circulation circuits C1 and C2. More specifically, connecting the fifth heat medium channel 65 branching off at a point from the fuel cell stack 20 to the second heat medium channel 62 with the second three-way valve 58 enables part of the heat medium circulated through the first circulation circuit C1 to flow into the second circulation circuit C2 according to the open-close position of the second three-way valve 58. The heat medium circulated through the second circulation circuit C2 is returned to the first circulation circuit C1 by a ninth heat medium channel 69 that is branched off at a point from the seventh heat medium channel 67 to the eighth heat medium channel 68 and is connected with the second heat medium channel 62 of the first circulation circuit C1.

Two input ports of the second three-way valve 58 are respectively connected with the fifth heat medium channel 65 and with the eighth heat medium channel 68, while an output port of the second three-way valve 58 is connected with the sixth heat medium channel 66. Like the first three-way valve 33, the second three-way valve 58 has two switch positions "a" and "b" and is operated to change over the port in response to a signal from the control unit 100. At the position "a" illustrated in FIG. 2, the second three-way valve 58 makes the eighth heat medium channel 68 communicate with the sixth heat medium channel 66 and blocks the communication with the fifth heat medium channel 65, so that the heat medium is circulated through the second circulation circuit C1. In the illustrated example of FIG. 2, the heat medium is thus independently circulated in the first circulation circuit C1 and in the second circulation circuit C2. Hereinafter this state that the heat medium is independently circulated in the first circulation circuit C1 and in the second circulation circuit C2 is called "independent state". When the second three-way valve 58 is changed over from this state to the operating position "b", on the other hand, the connection of flow passage is changed over, so that part of the heat medium circulated through the first circulation circuit C1 goes through the air-conditioning unit 50 on the second circulation circuit C2 and is returned to the first circulation circuit C1. Hereinafter this state is called "linked state".

The fuel cell stack 20 is provided as a polymer electrolyte fuel cell structured by stacking a plurality of unit cells including membrane electrode assemblies (MEA). Hydrogen gas is supplied as a fuel gas from a hydrogen gas tank (not shown) through a fuel gas channel 22 to the fuel cell stack 20. The air is supplied as an oxidizing gas by the air compressor 3 (FIG. 1) through an oxidizing gas channel 24 to the fuel cell stack 20. As described above, the heat medium as a coolant is supplied to the fuel cell stack 20 to cool down the respective unit cells having the raised temperatures during power generation. According to this embodiment, an antifreeze fluid prepared by, for example, adding ethylene glycol to water is used as the heat medium. Any cooling water, such as pure water, may be used instead of the antifreeze fluid. The heat medium may be a gas, such as carbon dioxide, instead of the cooling water.

A load 40 is electrically connected with the fuel cell stack 20 via an inverter (not shown), so that the electric power generated by the electrochemical reaction in the fuel cell stack 20 is supplied to the load 40. The load 40 herein means a set of various loads including, for example, the headlights 2, the air compressor 3, the drive motor 5, two power-driven fans 31 and 52 (described later), the first electric heater 55, the second electric heater 57 and the two pumps 32 and 54 as described previously. The various loads of the load 40 may include any electric devices mounted on the vehicle 1, such as a navigation device and an audio device (not shown).

A power-driven fan 31 (hereinafter referred to as "radiator fan") is placed near the radiator 30 provided in the third heat medium channel 63. The radiator 30 serves to cool downs the heat medium transferred from the fuel cell stack 20 via the second heat medium channel 62 with the air of the radiator fan 31 and release the heat of the heat medium out of the vehicle.

The fourth heat medium channel 64 serves as a bypass passage to bypass the radiator 30 and connect the second heat medium channel 62 with the first heat medium channel 61. The heat medium passing through the fourth heat medium channel 64 accordingly has less heat release than the heat medium passing through the third heat medium channel 63.

The first electric heater 55 is located downstream of the heater core 51 as described above and may serve to warm up the heat medium flowing through the seventh heat medium channel 67. More specifically, the first electric heater 55 serves to warm up the heat medium flowing through the seventh heat medium channel 67 in the linked state, when the temperature of the heat medium flowing through the first heat medium channel 61 (i.e., the temperature of the heat medium flowing into the fuel cell stack 20) is lower than an allowable temperature range of the heat medium for the fuel cell stack 20. This prevents the temperature of the heat medium flowing into the fuel cell stack 20 from decreasing below the allowable temperature range (for example, 70° C. to 75° C.), thus reducing a decrease in power generation efficiency of the fuel cell stack 20.

The second electric heater 57 is located upstream of the heater core 51 as described above and may serve to warm up the heat medium flowing through the sixth heat medium channel 66. More specifically, the second electric heater 57 serves to warm up the heat medium flowing into the heater core 51, when the temperature of the heat medium flowing into the core 51 is lower than the required temperature of the heat medium for the heater core 51. This raises the temperature of the heat medium flowing into the heater core 51 to a desired temperature and thereby allows the air-conditioning unit 50 to perform desired heating. The details of control of the first electric heater 55 and the second electric heater 57 will be described later.

The air-conditioning unit 50 includes the heater core 51 described above, a power-driven fan 52 (hereinafter referred to as "blower fan") and a casing 53. The heater core 51 serves as a heat exchange unit for heating and is heated with the heat of the heat medium flowing through the second circulation circuit C2. The blower fan 52 blows the air toward the heater core 51 and thereby enables the air heated by the heater core 51 to be blown out of the casing 53 (i.e., the inside of the vehicle interior 1r shown in FIG. 1). The air-conditioning unit 50 is connected with various outlets (e.g., ventilator, foot and defroster outlets) via ducts (not shown) to blow out the hot air from these outlets.

An operation panel 70 includes various switches operable by the driver or passenger. The various switches include an air-conditioning switch and switches for setting the vehicle interior temperature.

The control unit 100 mainly includes a CPU (Central Processing Unit) 101, a memory 102 and an input/output circuit 103. The input/output circuit 103 is connected with various actuators, various sensors and the operation panel 70 via signal lines (not shown).

A computer program (not shown) is stored in the memory 102 to mainly control the fuel cell system 10. The CPU 101 executes this computer program to serve as a heater controller 110 and a circuit switch controller 120. The heater controller 110 and the circuit switch controller 120 actuate the various actuators based on the detection values of the various sensors and the output signals of the operation panel 70, so as to control the temperature in the vehicle interior 1r. A first heater capacity varying map MP1 and a second heater capacity varying map MP2 used by the heater controller 110 are stored in advance in the memory 102. These maps will be described later.

The various actuators include, for example, the two power-driven fans 31 and 52, the two electric heaters 55 and 57, the two pumps 32 and 54 and the two three-way valves 33 and 58.

The various sensors include various temperature sensors, voltage sensors (not shown) and current sensors (not shown). According to this embodiment, a first temperature sensor 34 located upstream of the heat medium flow inlet of the fuel cell stack 20, a second temperature sensor 56 located upstream of the heat medium flow inlet of the heater core 51, a vehicle interior temperature sensor (not shown), a vehicle exterior temperature sensor (not shown) and a solar radiation sensor (not shown) are provided as the various temperature sensors. The first temperature sensor 34 measures the temperature T1 of the heat medium flowing into the fuel cell stack 20. The second temperature sensor 56 measures the temperature T2 of the heat medium flowing into the heater core 51.

Figure 3:
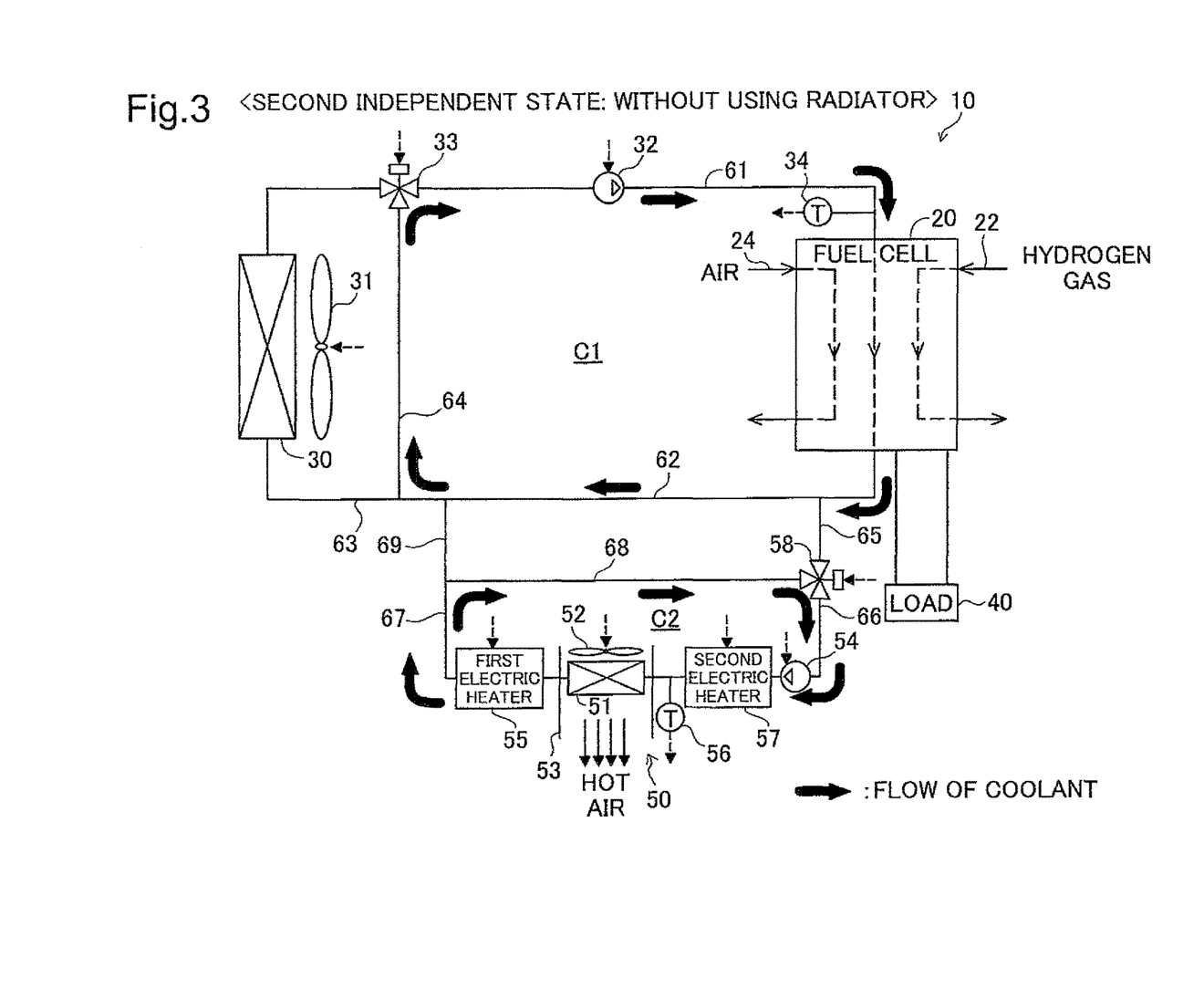
FIG. 3 illustrates a state that a heat medium flowing out of a second heat medium channel 62 all flows into a fourth heat medium channel 64 without flowing into a third heat medium channel 63 by controlling a first three-way valve 33.

FIG. 3 illustrates a state that the heat medium flowing out of the second heat medium channel 62 all flows into the fourth heat medium channel 64 without flowing into the third heat medium flow path 63 by controlling the first three-way valve 33. There are two independent states, i.e., the state that the fourth heat medium channel 64 is closed and the third heat medium channel 63 is open as shown in FIG. 2 (hereinafter referred to as "first independent state") and the state that the third heat medium channel 63 is closed and the fourth heat medium channel 64 is open as shown in FIG. 3 (hereinafter referred to as "second independent state"). In other words, the independent states include the first independent state with using the radiator 30 (FIG. 2) and the second independent state without using the radiator 30 (FIG. 3).

Figure 4:
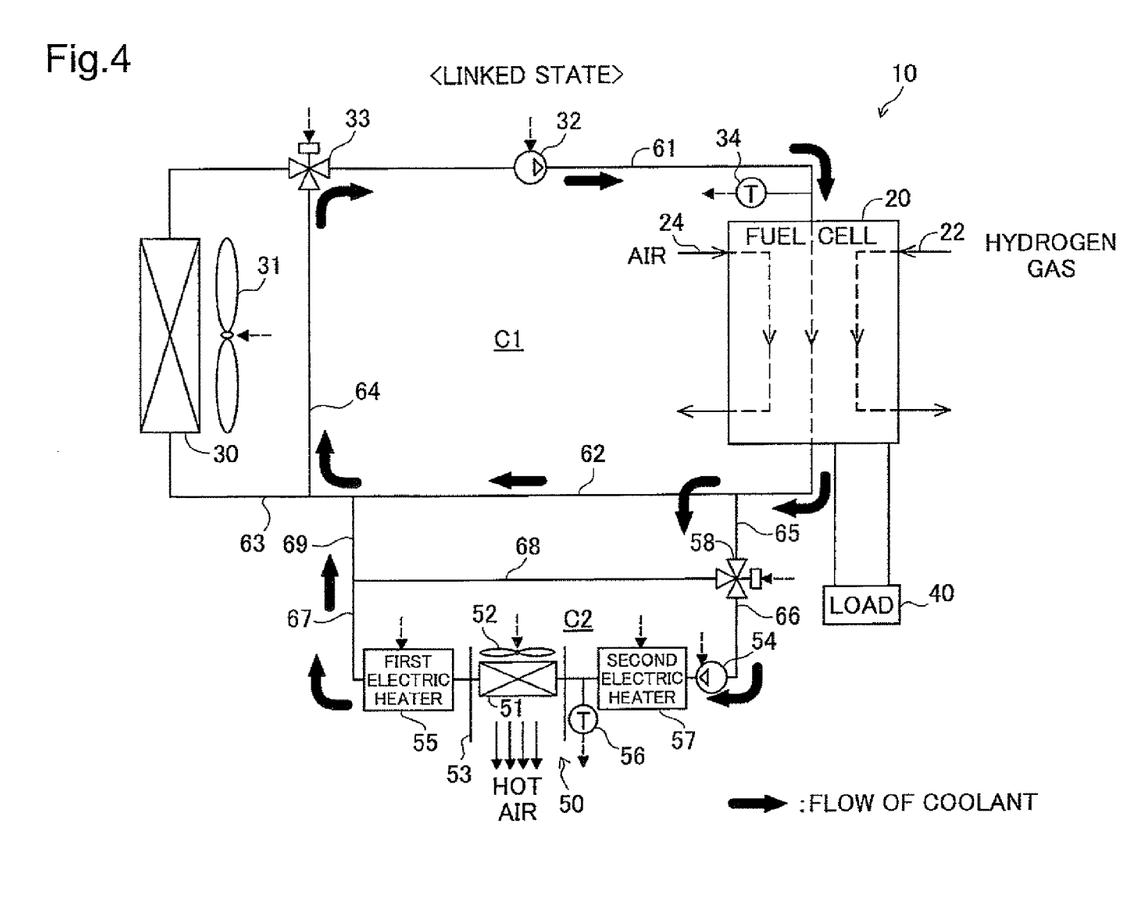
FIG. 4 illustrates a state that a first circulation circuit C1 and a second circulation circuit C2 are physically interconnected by controlling a second three-way valve 58.

FIG. 4 illustrates a state that the first circulation circuit C1 and the second circulation circuit C2 are physically interconnected by controlling the second three-way valve 58, This state corresponds to the linked state described above to enable exchange of the heat medium between the first circulation circuit C1 and the second circulation circuit C2. More specifically, in this state, the second three-way valve 58 connects the sixth heat medium channel 66 with the fifth heat medium channel 65, while disconnecting the sixth heat medium channel 66 from the eighth heat medium channel 68, so as to allow exchange of the heat medium between the first circulation circuit C1 and the second circulation circuit C2. In this linked state, the exhaust heat of the fuel cell stack 20 can be used for heating by the heating core 51.

In this linked state, the first three-way valve 33 is controlled, such that the heat medium flowing out of the second heat medium channel 62 all flows into the fourth heat medium channel 64 without flowing into the third heat medium channel 63 in the first circulation circuit C1. Such control aims to prevent the heat medium flowing into the heater core 51 from being cooled down by the radiator 30.

The circuit switch controller 120 (FIG. 2) regulates the first three-way valve 33 and the second three-way valve 58 to switch the circuit of the heat medium in the fuel cell system 10 to one of the first independent state, the second independent state and the linked state. The circuit switch controller 120 performs circuit switch control in various modes. More specifically, when the temperature of the fuel cell stack 20 is high temperature of not lower than a specific level and there is a request from the air-conditioning unit 50, the exhaust heat of the fuel cell stack 20 can be used for heating the heater core 51. The circuit switch controller 120 accordingly switches the fuel cell system 10 to the linked state (FIG. 4). When the temperature of the fuel cell stack 20 is high temperature of not lower than the specific level but there is no request from the air-conditioning unit 50, the circuit switch controller 120 switches the fuel cell system 10 to the first independent state (FIG. 2), in order to enable the heat medium passing through the fuel cell stack 20 to be cooled down by the radiator 30. When the temperature of the fuel cell stack 20 is lower than the specific level, the circuit switch controller 120 switches the fuel cell system 10 to the second independent state (FIG. 3).

A2. Control of Electric Heaters in Linked State

The following describes control of the electric heaters in the linked state. In the linked state described above, the heat medium passing through the heater core 51 flows through the seventh heat medium channel 67, the ninth heat medium channel 69, the fourth heat medium channel 64 and the first heat medium channel 61 and is supplied to the fuel cell stack 20. While the heat medium runs through the heater core 51, the temperature of the heat medium is decreased by heat exchange in the heater core 51. In some cases, the temperature T1 of the heat medium passing through the heater core 51 may become lower than the allowable temperature range for the fuel cell stack 20. The heater controller 110 accordingly performs feedback control of the heater capacity of the first electric heater 55, in order to regulate the temperature T1 of the heat medium measured by the first temperature sensor 34 to be within the allowable temperature range for the fuel cell stack 20.

The heater controller 110 also performs feedback control of the heater capacity of the second electric heater 57, in order to regulate the temperature T2 of the heat medium measured by the second temperature sensor 56 to a required temperature Two by the heater core 51. The following describes the details of such control process.

Figure 5:
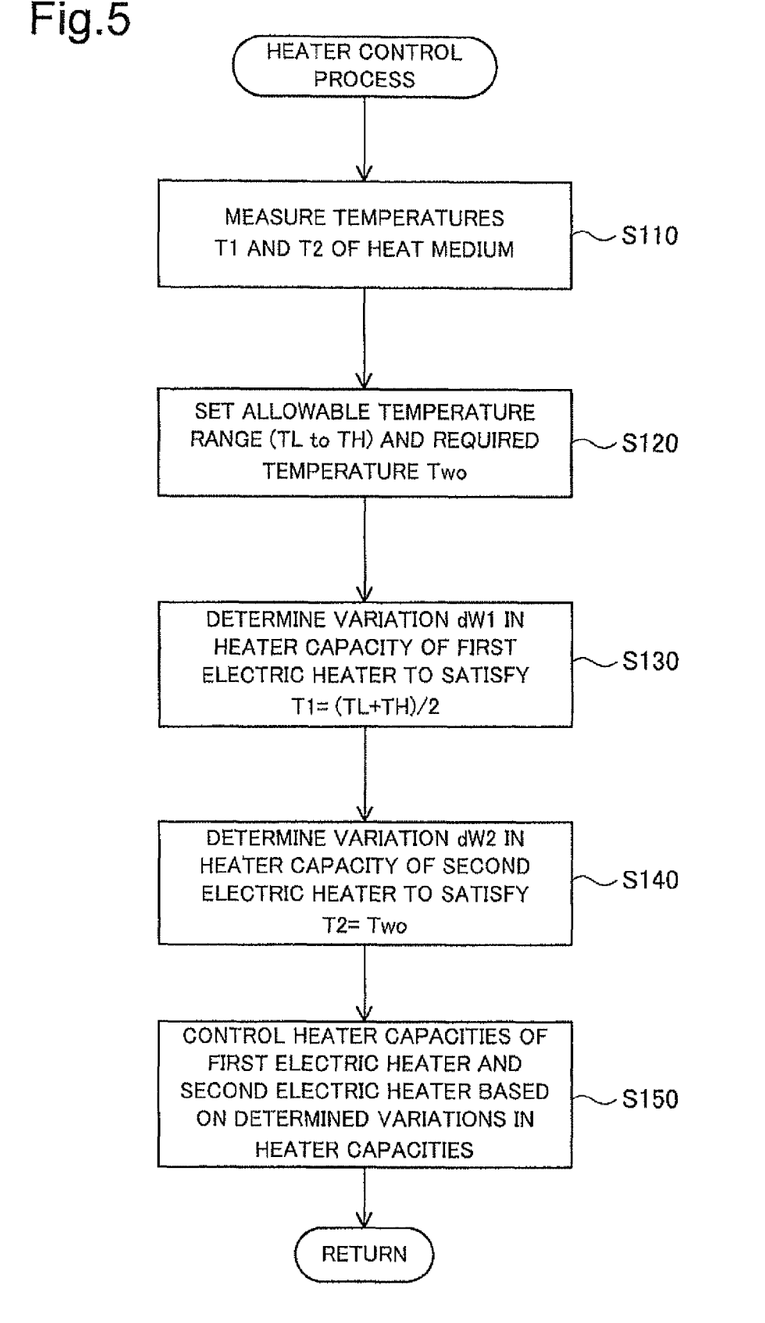
FIG. 5 is a flowchart showing an electric heater control process in a linkage state.

FIG. 5 is a flowchart showing one example of electric heater control process in the linked state. This electric heater control process is repeatedly performed at predetermined time intervals by the heater controller 110 of the control unit 100.

At step S110, the first temperature sensor 34 measures the temperature T1 of the heat medium before flowing into the fuel cell stack 20, and the second temperature sensor 56 measures the temperature T2 of the heat medium before flowing into the heater core 51.

At step S120, the heater controller 110 sets an allowable temperature range (TL° C. to TH° C.) for the heat medium flowing into the fuel cell stack 20. This allowable temperature range is set to prevent degradation of the fuel cell stack 20 and to enable the high efficient operation of the fuel cell stack 20. According to this embodiment, the allowable temperature range is set to 70° C. to 75° C. (i.e., TL=70° C. and TH=75° C.).

The heater controller 110 subsequently sets a required temperature Two as the temperature required for the heat medium flowing into the heater core 51, based on a target blow-out temperature Tao input from the air-conditioning unit 50. The target blow-out temperature Tao is a target value of the temperature of the air blown out by the air-conditioning unit 50 and may be calculated according to a separate routine by any known method. For example, the target blow-out temperature Tao may be determined, based on the difference between the vehicle interior temperature and the user's specified temperature with taking into account the vehicle exterior temperature and the solar radiation.

At step S130, the heater controller 110 performs feedback control of the heater capacity of the first electric heater 55 to regulate the temperature T1 to be within the allowable temperature range (TL° C. to TH° C.). More specifically, the heater controller 110 calculates $Ea_n$ and EDOTa according to the following equations:

$$Ea_n=(TL+TH)/2-T1$$

$$EDOTa=Ea_n-Ea_{n-1}$$

Here (TL+TH)/2 represents the median value of the allowable temperature range; $Ea_n$ represents the difference between the median value and the temperature T1 calculated in the current cycle of this routine; and $Ea_{n-1}$ represents the difference between the median value and the temperature T2 calculated in the previous cycle of this routine. In the next cycle of this routine, the value $Ea_n$ calculated in the current cycle of this routine is set to the value $Ea_{n-1}$ in the next cycle of this routine.

The heater controller 110 searches the first heater capacity varying map MP1 with the calculated values $Ea_n$ and EDOTa as keys to determine a variation dW1 in heater capacity of the first electric heater 55. The first heater capacity varying map MP1 is a 2-input table and has the variation dW1 in heater capacity registered in advance in correlation to the combination of the values $Ea_n$ and EDOTa. According to this embodiment, the variation dW1 in heater capacity in the first heater capacity varying map MP1 is set based on experimental data. The variation dW1 in heater capacity may, however, be set based on the result of simulation or the result of a predetermined arithmetic operation. More specifically, the variation dW1 in heater capacity is set to increase with an increase in value $Ea_n$ and is set to change with a change in value EDOTa with respect to a fixed value $Ea_n$. The second heater capacity varying map MP2 used at step S140 described below has the similar tendency to that of the first heater capacity varying map MP1.

At step S140 (FIG. 5), the heater controller 110 performs feedback control of the heater capacity of the second electric heater 57 to regulate the temperature T2 to the required temperature Two. More specifically, the heater controller 110 calculates $Eb_n$ and EDOTb according to the following equations:

$$Eb_n=\text{Two}-T2$$

$$EDOTb=Eb_n-Eb_{n-1}$$

Here $Eb_n$ represents the difference between the required temperature Two and the temperature T2 calculated in the current cycle of this routine; and $Eb_{n-1}$ represents the difference between the required temperature Two and the temperature T2 calculated in the previous cycle of this routine. In the next cycle of this routine, the value $Eb_n$ calculated in the current cycle of this routine is set to the value $Eb_{n-1}$ in the next cycle of this routine.

The heater controller 110 searches the second heater capacity varying map MP2 with the calculated values $Eb_n$ and EDOTb as keys to determine a variation dW2 in heater capacity of the second electric heater 57.

At step S150, the heater controller 110 controls the heater capacities of the first and the second electric heaters 55 and 57, based on the calculated variations dW1 and dW2 in heater capacities.

After completion of the processing at step S150, the heater controller 110 restarts the processing of step S110 after elapse of a predetermined time interval.

As described above, the fuel cell system 10 of the first embodiment is changeable among the first independent state, the second independent state and the linked state, thus enabling the effective use of the exhaust heat of the fuel cell stack 20. Additionally, in the linked state, the heat medium cooled down while going through the heater core 51 is heated up by the first electric heater 55. The temperature of the heat medium supplied to the fuel cell stack 20 can thus be regulated to be within the allowable temperature range for the fuel cell stack 20. This reduces a decrease in power generation efficiency of the fuel cell stack 20. Furthermore, the fuel cell system 10 of the first embodiment enables the heat medium supplied to the heater core 51 to be heated up by the second electric heater 57. The temperature of the heat medium can thus be regulated to the temperature required for the heater core 51.

B. Modifications

The invention is not limited to the above embodiment but various modifications and variations may be made to the embodiment without departing from the scope of the invention. Some examples of possible modifications are given below.

First Modification

In the independent state described in the above embodiment, the heat medium supplied to the heater core 51 may be heated up by the two electric heaters 55 and 57. This raises the temperature of the heat medium at a higher rate, compared with the configuration using only the second electric heater 57 for the same purpose.

Second Modification

According to the above embodiment, the first temperature sensor 34 is located in the first heat medium channel 61. This configuration is, however, not restrictive. The first temperature sensor 34 may be located at any position that is in the upstream of the fuel cell and allows measurement of the temperature of the heat medium before flowing into the fuel cell system 10. For example, the first temperature sensor 34 may be located, for example, in the fourth heat medium channel 64, in the ninth heat medium channel 69 or in the downstream of the joint with the ninth heat medium channel 69 in the second heat medium channel 62.

Third Modification

According to the above embodiment, the second temperature sensor 56 is located in the sixth heat medium channel 66. This configuration is, however, not restrictive. The second temperature sensor 56 may be located at any position that is in the upstream of the heater core 51 and allows measurement of the temperature of the heat medium before flowing into the heater core 51. For example, the second temperature sensor 56 may be located, for example, in the fifth heat medium channel 65 or in the upstream of the joint with the fifth heat medium channel 65 in the second heat medium channel 62.

Fourth Modification

According to the above embodiment, the temperature of the heat medium supplied to the fuel cell system 10 is regulated by heating the heat medium with the first electric heater 55. In addition to the first electric heater 55, a mechanism for decreasing the temperature of the heat medium (for example, fan) may be provided to regulate the temperature of the heat medium supplied to the fuel cell system 10. Similarly, in addition to the second electric heater 57, a mechanism for decreasing the temperature of the heat medium supplied to the heater core 51 may be provided to regulate the temperature of the heat medium supplied to the heater core 51.

Fifth Modification

According to the above embodiment, the two heater capacity varying maps MP1 and MP2 are used for feedback control of the heater capacities of the two electric heaters 55 and 57. According to another embodiment, only one heater capacity varying map may be commonly used for feedback control of the heater capacities of the two electric heaters 55 and 57. According to yet another embodiment, variations in heat capacities of the two electric heaters 55 and 57 may be calculated by specified arithmetic operations without using any map.

Sixth Modification

The fuel cell system 10 is mounted on the electric vehicle according to the above embodiment but may be applied to any of various vehicles including hybrid vehicles and train cars, as well as domestic power systems including an air-conditioning mechanism.

Seventh Modification

The fuel cell stack 20 is the polymer electrolyte fuel cell according to the above embodiment but may be any of various fuel cells including phosphoric-acid fuel cells, molten-carbonate fuel cells and solid oxide fuel cells.

Eighth Modification

In the above embodiment, part of the software configuration may be replaced by hardware configuration. On the contrary, part of the hardware configuration may be replaced by software configuration.

Among the various elements of the above embodiment and respective modifications, those other than the elements disclosed in independent claims are additional and supplementary elements and may be omitted as needed basis.

REFERENCE SIGNS LIST

1 Vehicle
1f Front Portion
1r Vehicle Interior
2 Headlights
3 Air Compressor
5 Drive Motor
7 Gear
10 Air-Conditioning System
22 Fuel Cell Stack
22 Fuel Gas Channel
24 Oxidizing Gas Channel
25 Second Three-Way Valve
30 Radiator 31 Radiator Fan
32 First Pump
33 First Three-Way Valve
34 First Temperature Sensor
40 Load
50 Air-Conditioning Unit
51 Heater Core
52 Blower Fan
53 Casing
54 Second Pump
55 First Electric Heater
56 Second Temperature Sensor
57 Second Electric Heater
58 Second Three-Way Valve
61 First Heat Medium Channel
62 Second Heat Medium Channel
63 Third Heat Medium Channel
64 Fourth Heat Medium Channel
65 Fifth Heat Medium Channel
66 Sixth Heat Medium Channel
67 Seventh Heat Medium Channel
68 Eighth Heat Medium Channel
69 Ninth Heat Medium Channel
100 Control Unit
101 CPU
102 Memory
103 Input/Output Circuit
110 Heater Controller
120 Circuit Switch Controller
C1 First Circulation Circuit
C2 Second Circulation Circuit

The invention claimed is:

1. A fuel cell system including a fuel cell, comprising:
a heater core used by a heating device;
a first circulation circuit arranged to circulate a heat medium through the fuel cell;
a second circulation circuit arranged to circulate the heat medium through the heater core;
a connection channel arranged to connect the first circulation circuit with the second circulation circuit and thereby circulate the heat medium between the first circulation circuit and the second circulation circuit;
a first temperature regulator located on the second circulation circuit and downstream of the heater core and configured to regulate temperature of the heat medium after flowing out of the heater core and before flowing into the fuel cell;
a first temperature sensor located upstream of the fuel cell and configured to measure temperature of the heat medium before flowing into the fuel cell;
a second temperature regulator located on the second circulation circuit and upstream of the heater core and configured to regulate temperature of the heat medium after flowing out of the fuel cell and before flowing into the heater core;
a second temperature sensor located upstream of the heater core and configured to measure temperature of the heat medium before flowing into the heater core; and
a controller configured to control the first temperature regulator based on the temperature of the heat medium measured by the first temperature sensor and to control the second temperature regulator based on the temperature of the heat medium measured by the second temperature sensor, wherein
the first temperature regulator is a first electric heater that has a first heater capacity,
the second temperature regulator is a second electric heater that has a second heater capacity, and
the controller performs feedback-control of the first heater capacity of the first electric heater based on a target temperature of the heat medium allowable for the fuel cell, and performs feedback-control of the second heater capacity of the second electric heater based on a target temperature of the heat medium required by the heating device.

2. A method of reducing a decrease in power generation efficiency of a fuel cell, comprising the steps of:
(a) employing a first circulation circuit to circulate a heat medium through the fuel cell;
(b) employing a second circulation circuit to circulate the heat medium through a heater core used by a heating device;
(c) connecting the first circulation circuit with the second circulation circuit to circulate the heat medium between the first circulation circuit and the second circulation circuit;
(d) employing a first temperature regulator located on the second circulation circuit and downstream of the heater core to regulate temperature of the heat medium after flowing out of the heater core and before flowing into the fuel cell;
(e) employing a first temperature sensor located upstream of the fuel cell to measure temperature of the heat medium before flowing into the fuel cell;
(f) employing a second temperature regulator located on the second circulation circuit and upstream of the heater core to regulate temperature of the heat medium after flowing out of the fuel cell and before flowing into the heater core;
(g) employing a second temperature sensor located upstream of the heater core to measure temperature of the heat medium before flowing into the heater core; and
(h) controlling the first temperature regulator based on the temperature of the heat medium measured by the first temperature sensor, while controlling the second temperature regulator based on the temperature of the heat medium measured by the second temperature sensor, wherein
the first temperature regulator is a first electric heater that has a first heater capacity,
the second temperature regulator is a second electric heater that has a second heater capacity, and
the step (h) performs feedback control of the first heater capacity of the first electric heater based on a target temperature of the heat medium allowable for the fuel cell, and performs feedback control of the second heater capacity of the second electric heater based on a target temperature of the heat medium required by the heating device.

* * * * *